United States Patent
Brown et al.

(10) Patent No.: US 12,154,702 B1
(45) Date of Patent: Nov. 26, 2024

(54) METHODS FOR MANUFACTURING A FREESTANDING SOLID STATE IONIC CONDUCTIVE MEMBRANE

(71) Applicant: Ampcera Inc., Milpitas, CA (US)

(72) Inventors: James Emery Brown, Tucson, AZ (US); Hui Du, Tucson, AZ (US); Chen Chen, Tucson, AZ (US); Sumin Zhu, San Francisco, CA (US)

(73) Assignee: Ampcera Inc., Milpitas, CA (US)

( * ) Notice: Subject to any disclaimer, the term of this patent is extended or adjusted under 35 U.S.C. 154(b) by 1004 days.

(21) Appl. No.: 16/653,228

(22) Filed: Oct. 15, 2019

Related U.S. Application Data

(60) Provisional application No. 62/745,508, filed on Oct. 15, 2018.

(51) Int. Cl.
| | |
|---|---|
| *B05D 1/00* | (2006.01) |
| *H01B 1/12* | (2006.01) |
| *H01B 13/00* | (2006.01) |
| *H01B 13/30* | (2006.01) |
| *B05D 1/18* | (2006.01) |

(52) U.S. Cl.
CPC ......... *H01B 13/0016* (2013.01); *H01B 1/122* (2013.01); *H01B 13/30* (2013.01); *B05D 1/18* (2013.01); *B05D 2201/00* (2013.01)

(58) Field of Classification Search
CPC ......... H01M 10/00; H01M 4/00; C23C 16/00; B05D 1/00
See application file for complete search history.

(56) References Cited

U.S. PATENT DOCUMENTS

| | | | |
|---|---|---|---|
| 3,508,994 A | | 4/1970 | Nyrop |
| 3,803,708 A | * | 4/1974 | Wada ............... H01C 17/281 29/423 |
| 4,255,208 A | | 3/1981 | Deutscher et al. |
| 4,668,593 A | | 5/1987 | Sammells |
| 4,770,908 A | | 9/1988 | Mori et al. |
| 4,816,200 A | * | 3/1989 | Stecher ............ H05K 3/4685 264/610 |
| 4,846,931 A | | 7/1989 | Gmitter et al. |
| 5,006,247 A | | 4/1991 | Dennison et al. |

(Continued)

FOREIGN PATENT DOCUMENTS

| | | |
|---|---|---|
| CN | 102718494 B | 3/2014 |
| EP | 0524678 A1 | 1/1993 |

(Continued)

OTHER PUBLICATIONS

"Solid-state dye-sensitized mesoporous TiO2 solar cells with high photon-to-electron conversion efficiencies", U. Bach, D. Lupo, P. Comte, J. E. Moser, F.Weissortel, Nature, vol. 395, Oct. 8, 1998.*

(Continued)

*Primary Examiner* — Kelly M Gambetta
*Assistant Examiner* — Mohammad Mayy
(74) *Attorney, Agent, or Firm* — Walters & Wasylyna LLC

(57) ABSTRACT

A method for manufacturing a freestanding solid state ionic conductive membrane includes forming a solid state ionic conductive membrane on a removable support substrate and removing the removable support substrate to provide the freestanding solid state ionic conductive membrane.

14 Claims, 16 Drawing Sheets

(56) References Cited

U.S. PATENT DOCUMENTS

| | | | |
|---|---|---|---|
| 5,160,618 | A | 11/1992 | Burggraaf et al. |
| 5,215,729 | A | 6/1993 | Buxbaum |
| 5,269,926 | A | 12/1993 | Webster et al. |
| 5,311,651 | A * | 5/1994 | Kim .................. H01G 4/302 |
| | | | 361/309 |
| 5,668,188 | A | 9/1997 | Whinnery et al. |
| 6,071,795 | A | 6/2000 | Cheung et al. |
| 6,352,909 | B1 | 3/2002 | Usenko |
| 6,461,772 | B1 | 10/2002 | Miyake et al. |
| 6,475,661 | B1 | 11/2002 | Pellegri et al. |
| 6,524,736 | B1 | 2/2003 | Sompalli et al. |
| 6,565,632 | B1 | 5/2003 | van Hassel |
| 6,649,559 | B2 | 11/2003 | Drost et al. |
| 6,699,276 | B2 | 3/2004 | Sogard et al. |
| 6,740,604 | B2 | 5/2004 | Kelly et al. |
| 6,974,521 | B2 | 12/2005 | Schermer |
| 7,108,813 | B2 | 9/2006 | Kang et al. |
| 7,125,626 | B2 | 10/2006 | Kato |
| 7,163,713 | B2 | 1/2007 | Jacobson et al. |
| 7,182,894 | B2 | 2/2007 | Kumar et al. |
| 7,316,919 | B2 | 1/2008 | Childs et al. |
| 7,442,303 | B2 | 10/2008 | Jacobson |
| 7,547,393 | B2 | 6/2009 | Ramaswamy et al. |
| 7,621,979 | B2 | 11/2009 | Kaigawa et al. |
| 7,767,256 | B2 | 8/2010 | Gu et al. |
| 7,767,257 | B2 | 8/2010 | Gu et al. |
| 7,820,321 | B2 | 10/2010 | Horne et al. |
| 7,846,847 | B2 | 12/2010 | Park et al. |
| 7,867,669 | B2 | 1/2011 | Liu et al. |
| 8,313,968 | B2 | 11/2012 | Elgawadi |
| 8,506,790 | B2 | 8/2013 | Balagopal et al. |
| 8,691,413 | B2 | 4/2014 | Esswein et al. |
| 8,715,392 | B2 | 5/2014 | Liu |
| 8,889,300 | B2 | 11/2014 | Bugga et al. |
| 9,156,006 | B2 | 10/2015 | Yip et al. |
| 9,259,508 | B2 | 2/2016 | Serafin et al. |
| 9,300,000 | B2 | 3/2016 | Jansen et al. |
| 9,368,775 | B2 | 6/2016 | Visco et al. |
| 9,419,299 | B2 | 8/2016 | Visco et al. |
| 9,512,041 | B2 | 12/2016 | Mcevoy et al. |
| 9,673,483 | B2 * | 6/2017 | Badding ............. H01M 10/052 |
| 9,724,640 | B2 | 8/2017 | Joo et al. |
| 9,954,229 | B2 | 4/2018 | Xiao |
| 10,079,391 | B2 | 9/2018 | Kjeang et al. |
| 10,088,751 | B2 | 10/2018 | Yang et al. |
| 10,578,962 | B2 | 3/2020 | Doi et al. |
| 2002/0173125 | A1 * | 11/2002 | Takeda ................ C23C 16/4418 |
| | | | 438/496 |
| 2004/0149572 | A1 * | 8/2004 | Schlenoff .............. B01D 71/80 |
| | | | 204/296 |
| 2005/0227455 | A1 | 10/2005 | Park et al. |
| 2006/0025866 | A1 | 2/2006 | Serafin et al. |
| 2007/0087328 | A1 | 4/2007 | Sleytr et al. |
| 2008/0142373 | A1 | 6/2008 | Joshi et al. |
| 2008/0173540 | A1 | 7/2008 | Joshi et al. |
| 2008/0299377 | A1 | 12/2008 | Gu et al. |
| 2009/0000475 | A1 | 1/2009 | Fekety et al. |
| 2009/0035631 | A1 | 2/2009 | Zagaja et al. |
| 2009/0057162 | A1 | 3/2009 | Balagopal et al. |
| 2009/0130477 | A1 | 5/2009 | Hou et al. |
| 2010/0233812 | A1 * | 9/2010 | Sun ..................... C01G 23/047 |
| | | | 95/45 |
| 2010/0331170 | A1 * | 12/2010 | Balagopal ............ C04B 35/16 |
| | | | 501/153 |
| 2011/0201180 | A1 | 8/2011 | Elgawadi |
| 2011/0223450 | A1 | 9/2011 | Horne et al. |
| 2012/0003524 | A1 * | 1/2012 | Jo ..................... H01M 50/406 |
| | | | 429/144 |
| 2012/0135278 | A1 | 5/2012 | Yoshie et al. |
| 2012/0308807 | A1 * | 12/2012 | Edwards .............. B01D 69/10 |
| | | | 977/890 |
| 2013/0011704 | A1 | 1/2013 | Horne et al. |
| 2013/0048509 | A1 | 2/2013 | Balagopal et al. |
| 2013/0323611 | A1 | 12/2013 | Wang et al. |
| 2014/0060324 | A1 * | 3/2014 | Ahn ..................... B01D 71/70 |
| | | | 96/10 |
| 2015/0024256 | A1 * | 1/2015 | Anandan ............ H01M 10/0562 |
| | | | 429/162 |
| 2015/0171463 | A1 * | 6/2015 | Liang ................. H01M 10/052 |
| | | | 429/322 |
| 2016/0334699 | A1 | 11/2016 | Doi et al. |
| 2019/0181461 | A1 | 6/2019 | Weber et al. |
| 2019/0217252 | A1 | 7/2019 | Newbloom et al. |

FOREIGN PATENT DOCUMENTS

| | | |
|---|---|---|
| EP | 2545984 A1 | 1/2013 |
| GB | 2565070 A | 2/2019 |
| JP | 5674040 B2 | 2/2015 |
| JP | 2015130481 A * | 7/2015 |

OTHER PUBLICATIONS

JP-2015130481-A, English Translated (Year: 2015).*
"Cathodes for Solid-State Lithium-Oxygen Cells: Roles of NaSiCON Glass-Ceramics", Binod Kumar, and Jitendra Kumar, Journal of The Electrochemical Society, 157 (5) A611-A616. (Year: 2010).*
"Thick film, Springer Handbook of Electronic and Photonic Materials", Springer, Safa Kasap, Perter Capper, Chapter 30, pp. 717-731. (Year: 2006).*
Brushett et al.: An All-Organic Non-aqueous Lithium-Ion Redox Flow Battery, Advanced Energy Materials, 2012, vol. 2, pp. 1390-1396.
Chen et al.: Lithium-Organic Nanocomposite Suspension for High-Energy-Density Redox Flow Batteries, ACS Energy Letter, 2018, vol. 3, pp. 1991-1997.
Delmdahl et al.: Large-Area Laser-Lift-Off Processing in Microelectronics, Physics Procedia, 2013, vol. 41, pp. 241-248.
Ding et al.: A High-Performance All-Metallocene-Based, Non-Aqueous Redox Flow Battery, Energy & Environmental Science, 2017, vol. 10, pp. 491-497.
Doughty et al.: Batteries for Large-Scale Stationary Electrical Energy Storage, The Electrochemical Society Interface, 2010, vol. 19, No. 3, pp. 49-53.
Duduta et al.: Semi-Solid Lithium Rechargeable Flow Battery, Advance Energy Materials, 2011, vol. 1, No. 4, pp. 511-516.
Hamelet et al.: Non-Aqueous Li-Based Redox Flow Batteries, Journal of the Electrochemical Society, 2012, vol. 159, No. 8, pp. A1360-A1367.
Jia et al.: High-Energy Density Nonaqueous All Redox Flow Lithium Battery Enabled with a Polymeric Membrane, Science Advances, 2015, vol. 1, No. 10, p. e1500886.
Kouras et al.: Macro-Porous Ceramic Supports for Membranes Prepared from Quartz Sand and Calcite Mixtures, Journal of the European Ceramic Society, 2017, vol. 37, No. 9, pp. P3159-P3165.
Lee et al.: Water-Soluble Epitaxial NaCl Thin Film for Fabrication of Flexible Devices, Scientific Reports, 2017, vol. 7, No. 8716, pp. 1-7.
Liao et al.: A Macro-Porous Graphene Oxide-Based Membrane as a Separator with Enhanced Thermal Stability for High-Safety Lithium-ion Batteries, Royal Society of Chemistry Advances, 2017, vol. 7, No. 36, pp. 22112-22120.
Lobankova et al.: Laser Lift-Off Technique, Modern Technique and Technologies 2012, pp. 26-27.
Placke et al.: Lithium ion, Lithium Metal, and Alternative Rechargeable Battery Technologies: The Odyssey for High Energy Density, Journal of Solid State Electrochemistry, 2017, vol. 21, No. 7, pp. 1939-1964.
Prifti et al.: Membranes for Redox Flow Battery Applications, Membranes, 2012, vol. 2, No. 2, pp. 275-306.
R. Jonson and P. McGinn, Tape Casting and Sintering of Li7La3Zr1.75Nb0.25Al0.1O12 with Li3BO3 Additions, Solid State Ionics, 2018, vol. 323, No. 1, pp. 49-55.
Salimi Jazi et al.: Spray-Formed, Metal-Foam Heat Exchangers for High Temperature Applications, Journal of Thermal science and Engineering Applications, 2009, vol. 1, No. 3, pp. 031008 (7 pages).

(56) References Cited

OTHER PUBLICATIONS

Skyllas-Kazacos et al.: Progress in Flow Battery Research and Development, Journal of Electrochemical Socity, 2011, vol. 158, No. 8, pp. R55-R79.
G. Soloveichik: Battery Technologies for Large-Scale Stationary Energy Storage, Annual Review of Chemical and Biomolecular Engineering, 2011, vol. 2, pp. 503-527.
Wang et al.: Li-Redox Flow Batteries Based on Hybrid Electrolytes: At the Cross Road between Li-ion and Redox Flow Batteries, Advance Energy Materials, 2012, vol. 2, No. 7, pp. 770-779.
Wang et al.: Recent Progress in Redox Flow Battery Research and Development, Advance Functional Materials, 2012, vol. 23, No. 8, pp. 1-17.
Weber et al.: Redox Flow Batteries: A Review, Journal of Applied Electrochemistry, 2011, vol. 41, pp. 1137-1164.
Yang et al.: A Membrane-Free Lithium/Polysulfide Semi-Liquid Battery for Large-Scale Energy Storage, Energy & Environmental Science, 2013, vol. 6, pp. 1552-1558.
Yi et al.: Flame Made Nanoparticles Permit Processing of Dense, Flexible, Li+ Conducting Ceramic Electrolyte Thin Films of Cubic-Li7La3Zr2O12 (c-LLZO), Journal of Materials Chemistry A, 2016, vol. 4, No. 33, pp. 12947-12954.
Zhang et al.: Porous Silicon Carbide Ceramics Produced by a Carbon Foam Derived from Mixtures of Mesophase Pitch and Si Particles, Journal of the American Ceramic Society, 2009, vol. 92, No. 1, pp. 260-263.
Zhao et al.: A Chemistry and Material Perspective on Lithium Redox Flow Batteries Towards High-Density Electrical Energy Storage, Chemical Society Reviews, 2015, vol. 44, No. 22, pp. 7968-7996.

\* cited by examiner

METHODS FOR MANUFACTURING A FREESTANDING SOLID STATE IONIC CONDUCTIVE MEMBRANE

PRIORITY

The present invention claims the priority of U.S. Provisional Patent Application No. 62/745,508, filed Oct. 15, 2018, which is incorporated herein by reference in its entirety.

FIELD

The present application relates to the field of solid state ionic conductive membranes and methods for manufacturing solid state ionic conductive membranes.

BACKGROUND

Solid state ionic conductive membranes have grown in interest in recent years for applications such as alkaline metal (Li, Na, K) purification, elemental separation, proton transportation based redox flow batteries or fuel cells, and solid-state electrolytes for primary and rechargeable alkaline batteries or other metal ion batteries include but not limited to Ag, Mg, Al, Zn, etc.

SUMMARY

In an embodiment of the present disclosure, a method for manufacturing a freestanding solid state ionic conductive membrane includes forming a solid state ionic conductive membrane on a removable support substrate and removing the removable support substrate to provide the freestanding solid state ionic conductive membrane.

Other embodiments of the disclosed method for manufacturing a freestanding solid state ionic conductive membrane will become apparent from the following detailed description, the accompanying drawings and the appended claims.

DETAILED DESCRIPTION

Figure 1A:
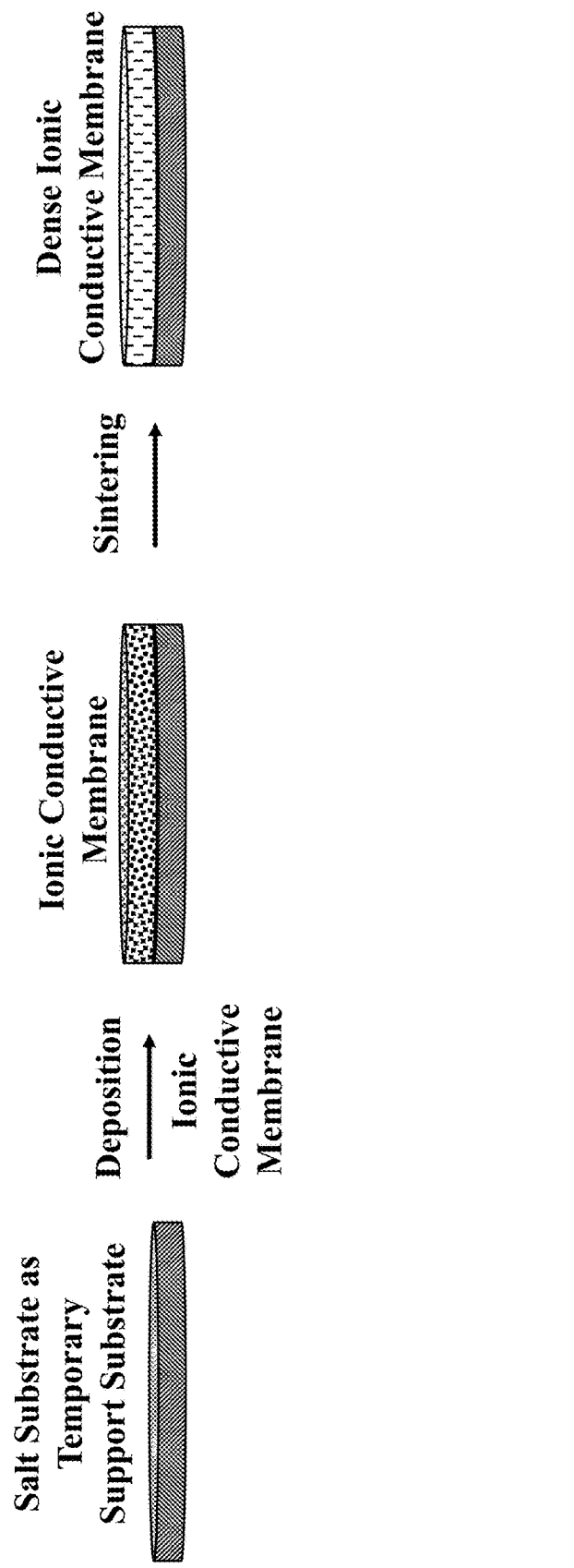
FIG. 1a is schematic illustrating the deposition of a solid state ionic conductive membrane onto a dissolvable salt substrate.

In an embodiment of the present disclosure, a method for manufacturing a freestanding solid state ionic conductive membrane may include forming a solid state ionic conductive membrane on a removable support substrate and may include removing the removable support substrate to provide the freestanding solid state ionic conductive membrane.

The method for manufacturing the freestanding solid state ionic conductive membrane may include any one or more of the following aspects, separately or in combination.

The step of forming the solid state ionic conductive membrane on the removable support substrate may include, for example, at least one of slurry sedimentation, spraying, dipping, filtration, pyrolysis, electroplating, plasma spray, thermal spray, fume spray, screen printing, tape casting, injection, chemical vapor deposition, physical vapor deposition, and sputtering.

The removable support substrate may include a dissolvable material, and the step of removing the removable support substrate may include dissolving the dissolvable material. The dissolvable material may include, for example, a salt.

The removable support substrate may be a dissolvable substrate, and the step of removing the removable support substrate may include dissolving the dissolvable substrate. The dissolvable substrate may include, for example, a salt substrate.

The removable support substrate may include a dissolvable film on a support substrate, and the step of removing the removable support substrate may include dissolving the dissolvable film. The dissolvable film may include, for example, a salt film.

The removable support substrate may include a combustible material, and the step of removing the removable support substrate may include combusting the combustible material.

The removable support substrate may include a resin, and wherein the step of removing the removable support substrate may include removing the resin.

The step of removing the resin may include, for example, at least one of chemically or thermally removing the resin.

The removable support substrate may include a solid material, and the step of removing the removable support substrate may include, for example, at least one of melting and sublimating the solid material.

The solid material may include, for example, at least one of dry ice and frozen water.

The removable support substrate may include a metal, and the step of removing the removable support substrate may include removing the metal. The metal may be a pure metal or an alloy metal.

The step of removing the metal may include, for example, at least one of melting and dissolving. Melting may include fully melting the metal or partially melting (e.g., dewetting) the metal. Dissolving may include completely dissolving the metal or partially dissolving the metal (e.g., etching).

The removable support substrate may include a biodegradable material, and the step of removing the removable support substrate may include decomposing the biodegradable material.

The step of removing the removable support substrate may include passing a laser through the removable support substrate to delaminate the solid state ionic conductive membrane from the removable support substrate.

The method for manufacturing a freestanding solid state ionic conductive membrane may further include densifying the solid state ionic conductive membrane.

The step of densifying the solid state ionic conductive membrane may occur before, during, or after the step of removing the removable support substrate.

The step of densifying the solid state ionic conductive membrane may include heat treating the solid state ionic conductive membrane.

The step of heat treating the solid state ionic conductive membrane may include sintering the solid state ionic conductive membrane.

The method for manufacturing the freestanding solid state ionic conductive membrane may further include any one or more of the following additional aspects, separately or in combination, together with any one or more of the previous aspects, as well as any one or more aspects illustrated in the drawings.

A solid state ionic conductive membrane include or is formed from a solid state ionic conductive material. A solid state ionic conductive material can be described as a material that may have the following characteristics:

A solid state ionic conductive material is a type of material that can selectively allow a specific charged element to pass through under the presence of an electric field or chemical potential, such as concentration differences.

While this solid state ionic conductive material allows ions to migrate through, it may not allow electrons to pass easily.

The ions may carry 1, 2, 3, 4 or more positive charges. Examples of the charged ions include but not limited to $H^+$, $Li^+$, $Na^+$, $K^+$, $Ag^+$, $Mg^{2+}$, $Al^{3+}$, $Zn^{4+}$, etc.

The present disclosure outlines several exemplary methods to construct a freestanding solid state ionic conductive membrane by constructing the solid state ionic conductive membrane on a removable support substrate.

An advantageous feature of the present disclosure is the ability to construct thin freestanding solid state ionic conductive membrane. In an aspect, a freestanding solid state ionic conductive membrane may be formed to a preferred thickness of 0<thickness<400 μm. Reducing the membrane thickness will help increase the ionic conductance of the ions of interest thereby enhancing the performance of the membrane.

Moreover, when membranes are sintered and thinned by traditional lapping and polishing methods, the membranes may suffer from inherent fragility. By forming a thin freestanding solid state ionic conductive membrane according to method of the present disclosure, the fragility to the thinning process may be avoided.

Another advantageous feature of the present disclosure is that it makes the processing more feasible and scalable, by which the present disclosure can make the membranes in large areas. This method can reduce the production cost significantly.

Another advantageous feature of the present disclosure is that free standing membranes make it easier to integrate the material to existing battery systems.

This present disclosure further relates to structural designs of the freestanding solid state ionic conductive membranes formed from the removal of the freestanding ionic conductive membrane from the removable support substrate.

A freestanding solid state ionic conductive membrane of the present disclosure may have one or more of the following characteristics.

In an aspect, the preferred ionic conductivity of the solid state ionic conductive material may be higher than $>10^{-7}$ S/cm, more preferably in the range of $>10^{-4}$ S/cm.

In another aspect, the solid state ionic conductive membrane after processing preferably has a density of 80% or higher of the theoretical density of the solid state ionic conductive material.

In another aspect, the membrane thickness may preferably be thicker than 50 nm and thinner than 400 micrometer.

In another aspect, the resulting membrane crystal structure doesn't need to have any epitaxial relationship with the supporting materials, it can be either crystalline, amorphous or combination of the two.

In another aspect, the solid state ionic conductive membrane is chemically inert to any liquid media it is exposed to, thus to avoid chemical corrosion and erosion during removal from the removable support substrate.

In another aspect, the solid state ionic conductive membrane is generally planar with some exceptions such as where the removable support substrate might happen to be non-planar.

In another aspect, the solid state ionic conductive membrane is be able to withstand the applied temperature that is required for the removal of the removable support substrate.

In another aspect, the solid state ionic conductive membrane is chemically compatible with the removable support substrate.

In another aspect, the solid state ionic conductive membrane meets mechanical strength requirements to withstand the forces applied during removal from the removable support substrate, In another aspect, the solid state ionic conductive membrane may also have one or more of the following additional characteristics.

A solid state ionic conductive membrane may be electrically conductive, semi-electrically conductive or non-electrically conductive.

A solid state ionic conductive membrane may be chemically stable in an aqueous or non-aqueous solution.

A solid state ionic conductive membrane may be stable in an acidic or basic solution.

A solid state ionic conductive membrane may require further thermal treatment for densification purposes.

A solid state ionic conductive membrane may have a low porosity prior to sintering.

A solid state ionic conductive membrane may have a high or low tensile strength within reasonable application requirement.

A solid state ionic conductive membrane may have ferroelectric, ferromagnetic properties, or any other functional properties involving electrical, optical, mechanical, catalytical, and magnetic properties.

Examples of the solid state ionic conductive material may include a garnet-like structure oxide material with the general formula:

$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12},$$

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv. wherein $0 \le a' \le 2$ and $0 \le a'' \le 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv. wherein $0 \le b'$, $0 \le b''$, and $b'+b'' \le 2$;

c. where C' and C" stand for a tetrahedral position of the crystal structure, i. where C' stands for one or more of Al, Ga, and boron, ii. where C" stands for one or more of Si and Ge, and iii. wherein $0 \le c' \le 0.5$ and $0 \le c'' \le 0.4$; and d. wherein $n=7+a'+2 \cdot a''-b'-2 \cdot b''-3 \cdot c'-4 \cdot c''$ and $4.5 \le n \le 7.5$.

Additional examples of the solid state ionic conductive material may include perovskite-type oxides such as (Li,La)TiO$_3$ or doped or replaced compounds.

Additional examples of the solid state ionic conductive material may include NASICON-structured lithium membrane, such as LAGP ($Li_1+xAl_xGe_{2-x}(PO_4)_3$), LATP ($Li_1+xAl_xTi_{2-x}(PO_4)_3$) and these materials with other elements doped.

Additional examples of the solid state ionic conductive material may include anti-perovskite structure materials.

Additional examples of the solid state ionic conductive material may include $Li_3YH_6$ (H=F, Cl, Br, I) family of materials, Y can be replaced by other rare earth elements.

This present disclosure further outlines characteristics of the removable support substrate.

The removable support substrate is preferred to be chemically compatible with the solid state ionic conductive membrane.

The removable support substrate is preferred to be either compatible with the sintering temperature of the solid state ionic conductive membrane or capable of withstanding a reasonable temperature to partially densify the solid state ionic conductive membrane.

The removable support substrate is preferred to be chemically stable with any solutions or materials used to build the solid state ionic conductive membrane.

The removable support substrate is preferred to be chemically compatible with any solutions used in the removal process of the freestanding ionic conductive membrane.

The removable support substrate may need to withstand any conditions it is exposed and any materials it is subjected to during the formation of the solid state ionic conductive membrane.

The drawings of the present disclosure further described examples of freestanding solid state ionic conductive membranes and methods for constructing freestanding solid state ionic conductive membranes on removable support substrates and then removing the removable support substrates to provide the freestanding solid state ionic conductive membrane.

FIG. 1a: A schematic illustrating the deposition of a solid state ionic conductive membrane onto a dissolvable salt substrate.

Figure 1B:
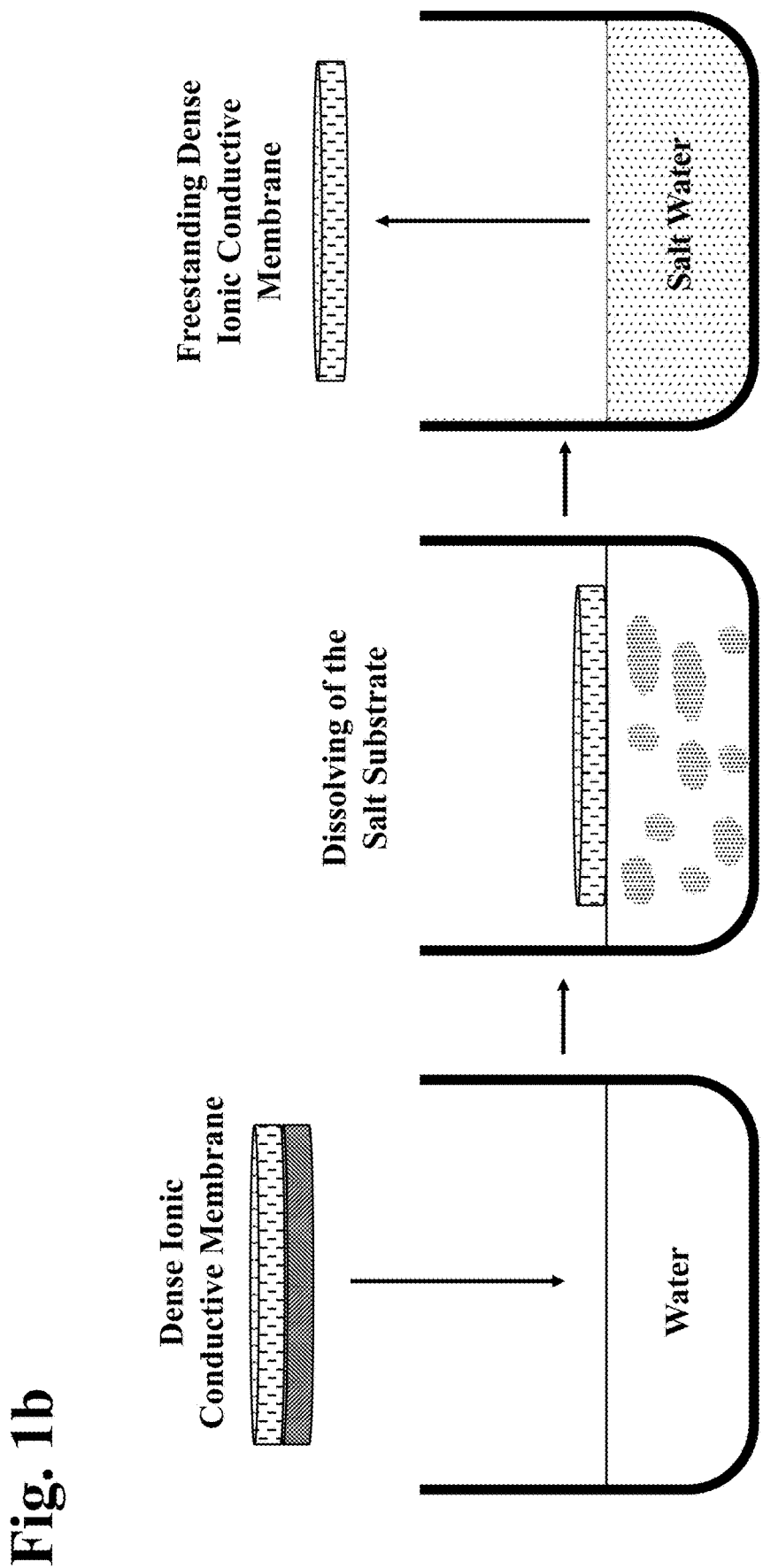
FIG. 1b is a schematic illustrating the removal of the dissolvable substrate in water.

FIG. 1b: A schematic illustrating the removal of the dissolvable substrate in water.

Figure 2A:
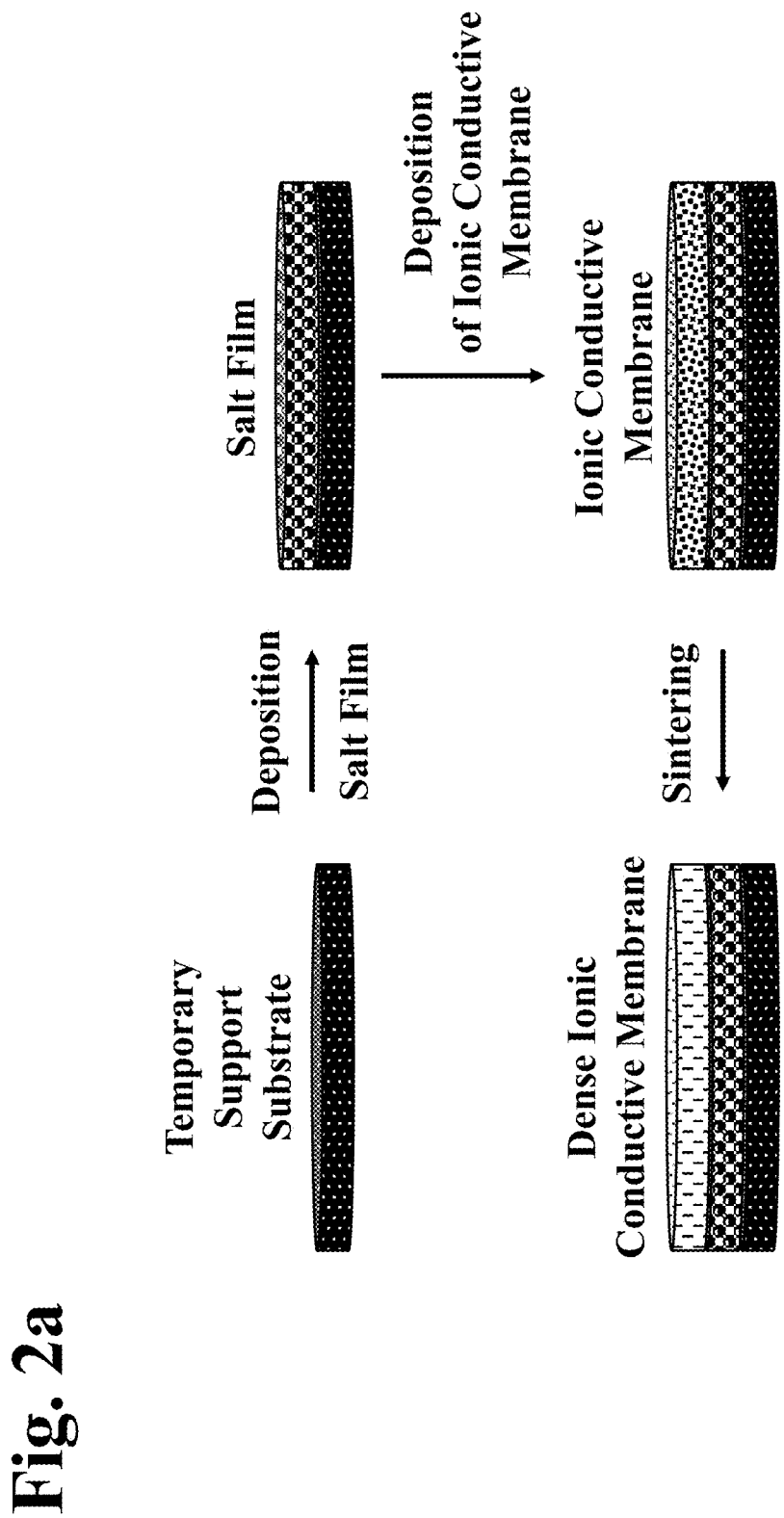
FIG. 2a is a schematic illustrating the deposition of a salt film and a solid state ionic conductive membrane onto a removable support substrate.

FIG. 2a: A schematic illustrating the deposition of a salt film and a solid state ionic conductive membrane onto a removable support substrate.

Figure 2B:
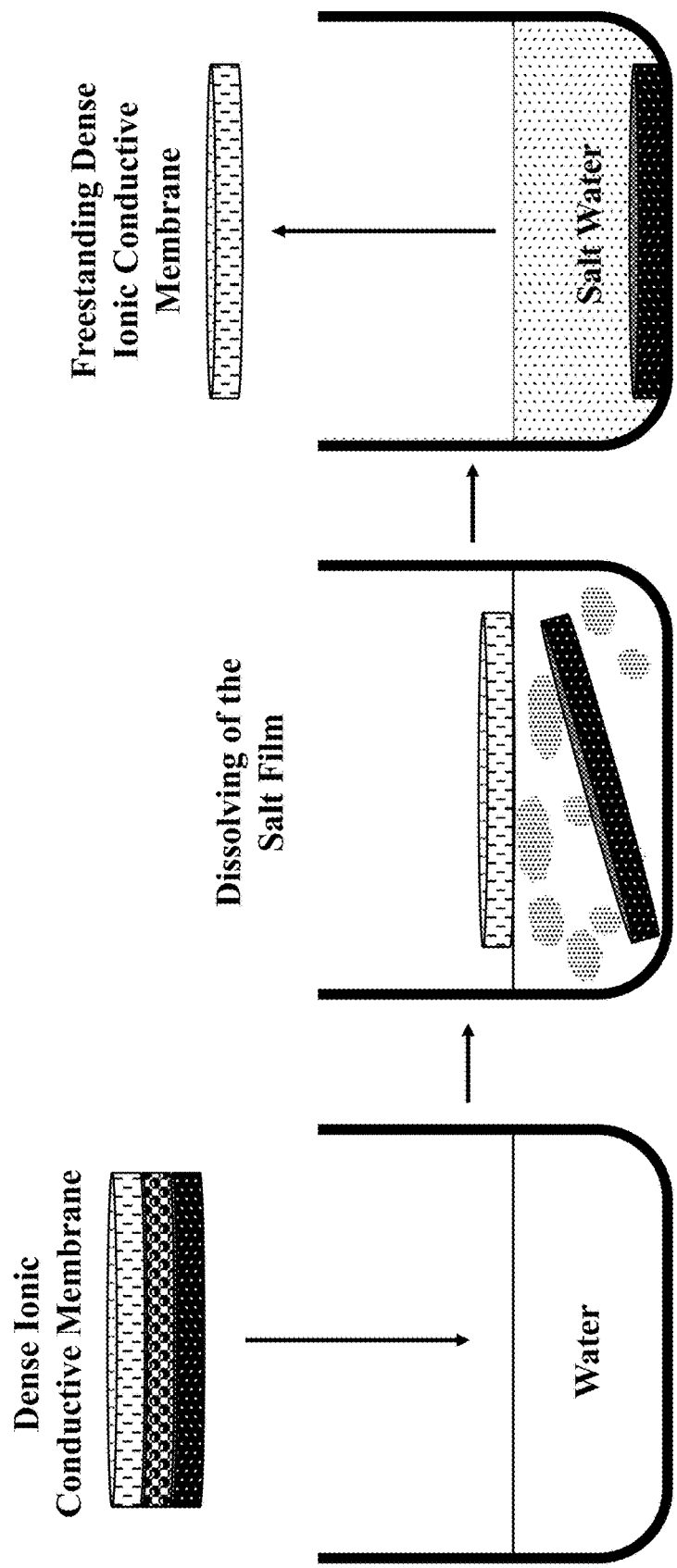
FIG. 2b is a schematic illustrating the removal of the salt film in water. The salt can be removed before sintering (2a) if the film can withhold itself.

FIG. 2b: A schematic illustrating the removal of the salt film in water. The salt can be removed before sintering (2a) if the film can withhold itself.

Figure 3:
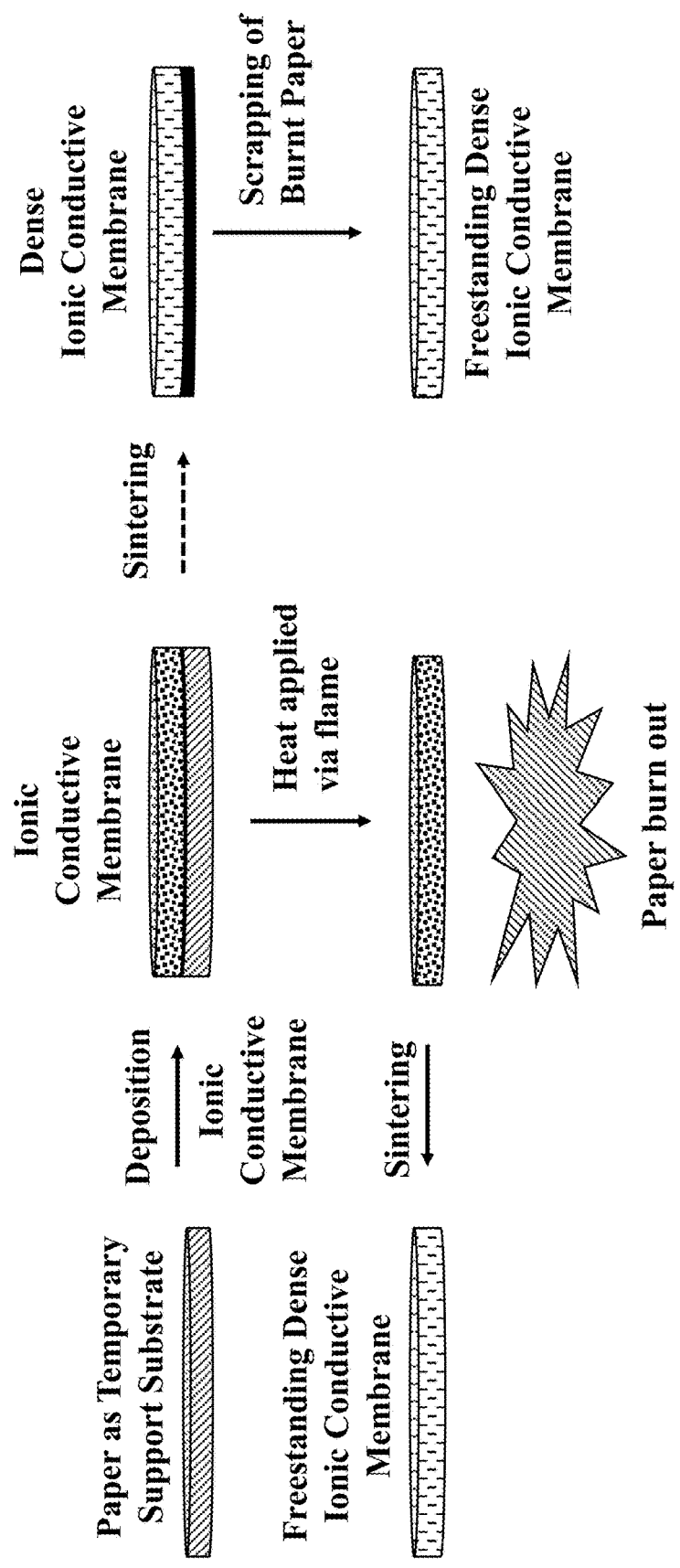
FIG. 3 is a schematic illustrating the deposition of a solid state ionic conductive membrane onto a combustible material followed by sintering and removal of the material by combustion.

FIG. 3: A schematic illustrating the deposition of a solid state ionic conductive membrane onto a combustible material followed by sintering and removal of the material by combustion.

Figure 4A:
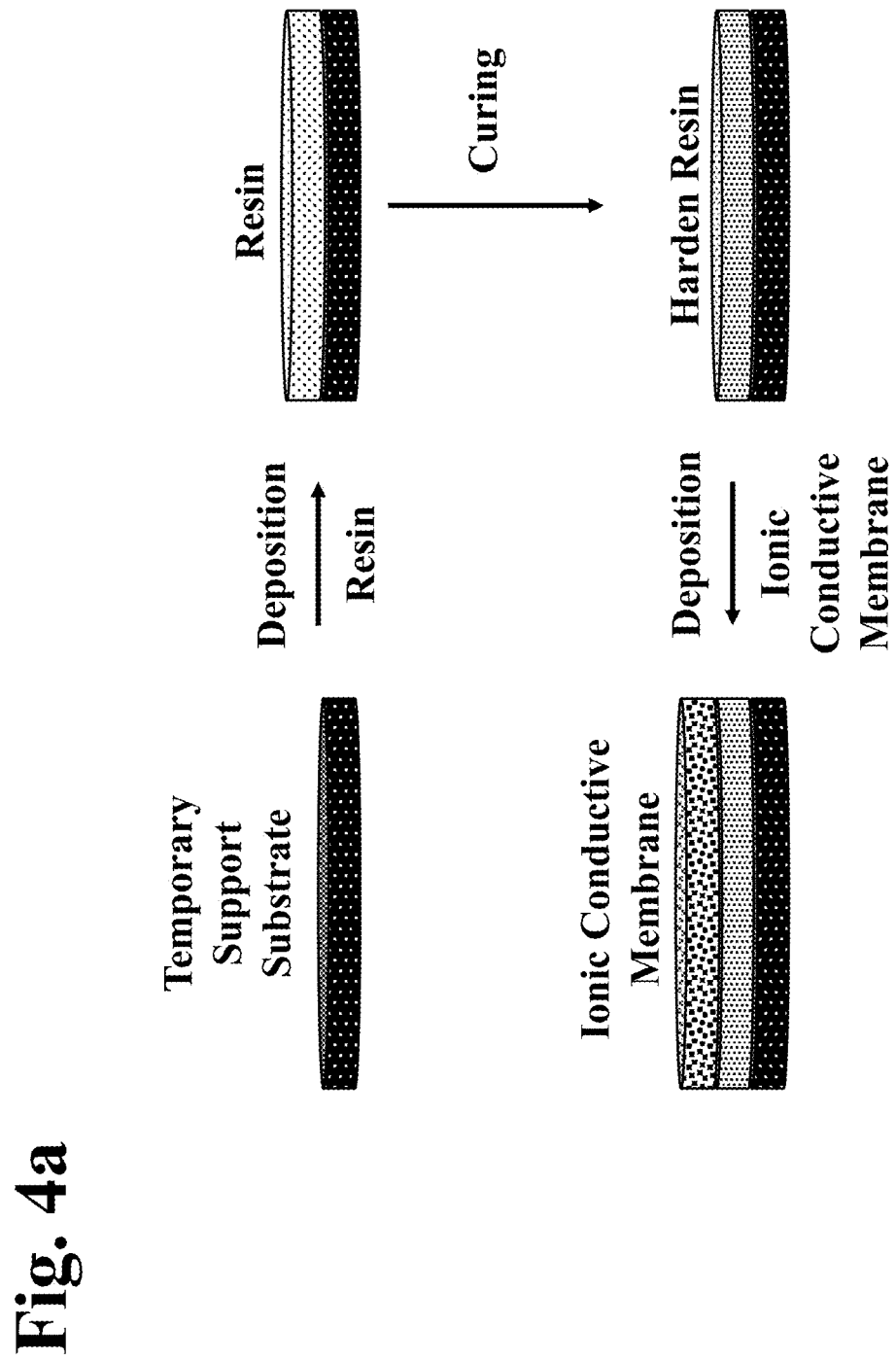
FIG. 4a is a schematic illustrating the deposition of a resin film and a solid state ionic conductive membrane.

FIG. 4a: A schematic illustrating the deposition of a resin film and a solid state ionic conductive membrane.

Figure 4B:
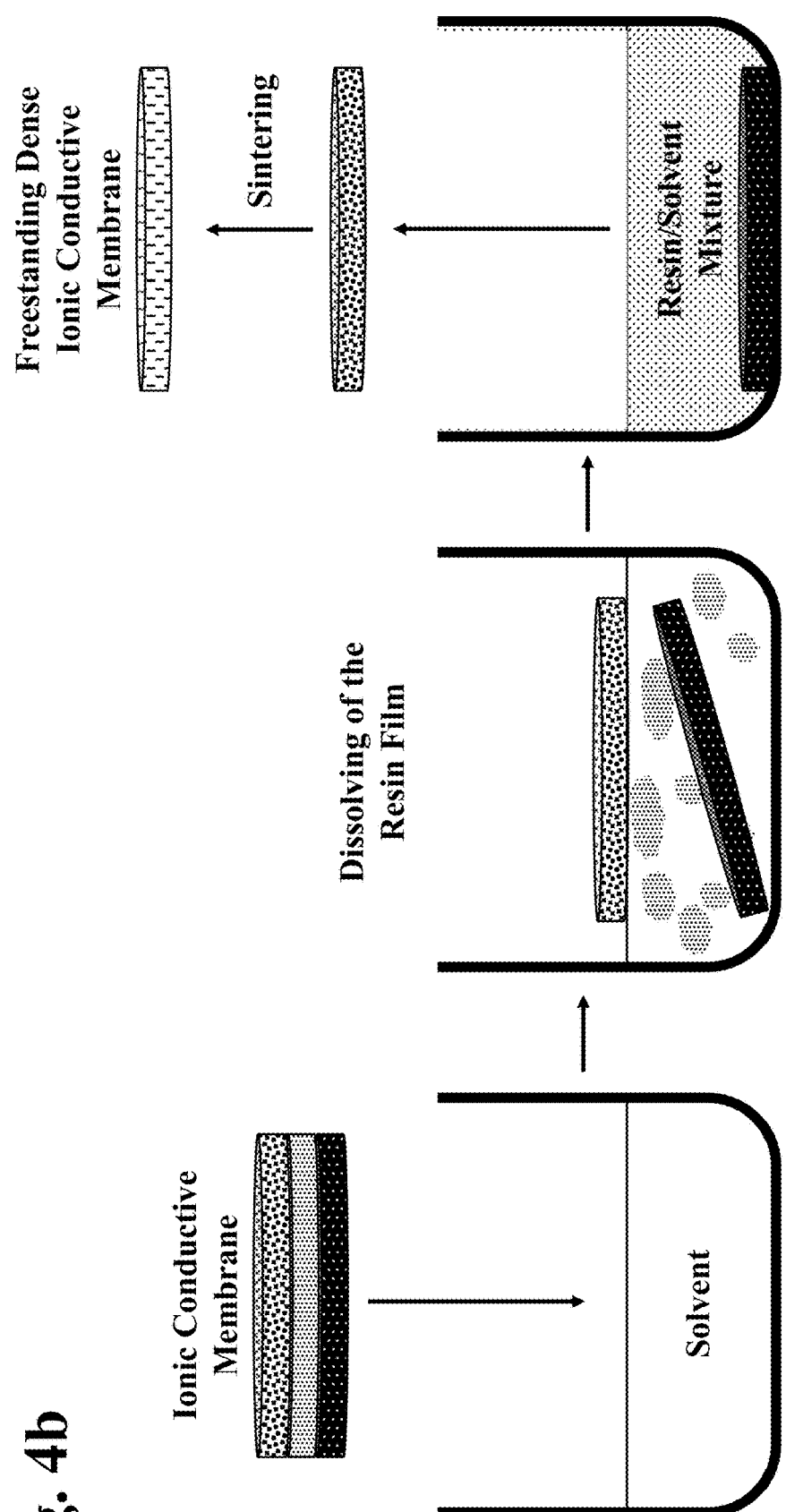
FIG. 4b is a schematic illustrating the removal of the resin film in a solvent followed by sintering.

FIG. 4b: A schematic illustrating the removal of the resin film in a solvent followed by sintering.

Figure 4C:
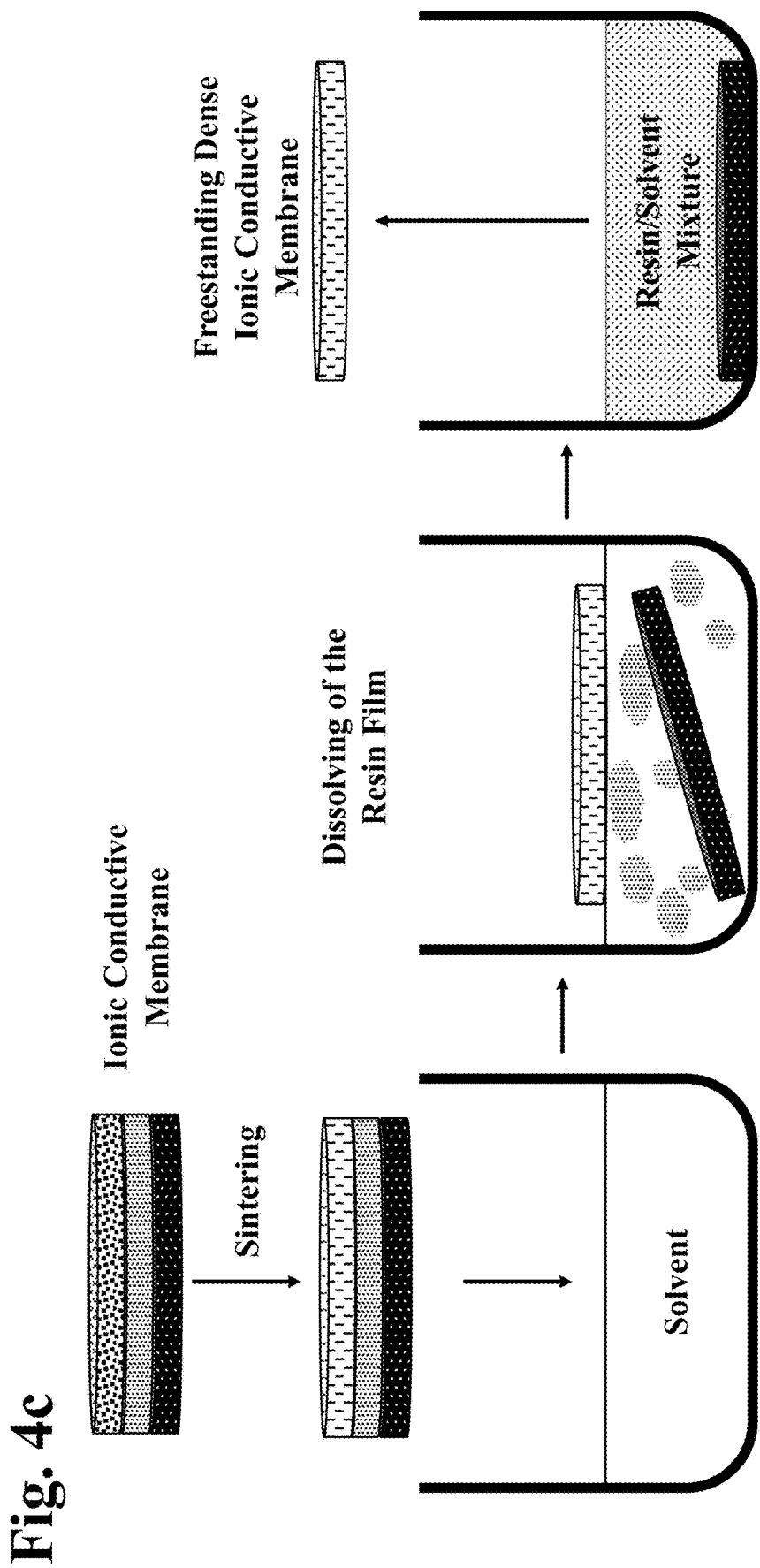
FIG. 4c is a schematic illustrating the sintering of a solid state ionic conductive membrane followed by the removal of a resin film in a solvent.

FIG. 4c: A schematic illustrating the sintering of a solid state ionic conductive membrane followed by the removal of a resin film in a solvent.

Figure 5:
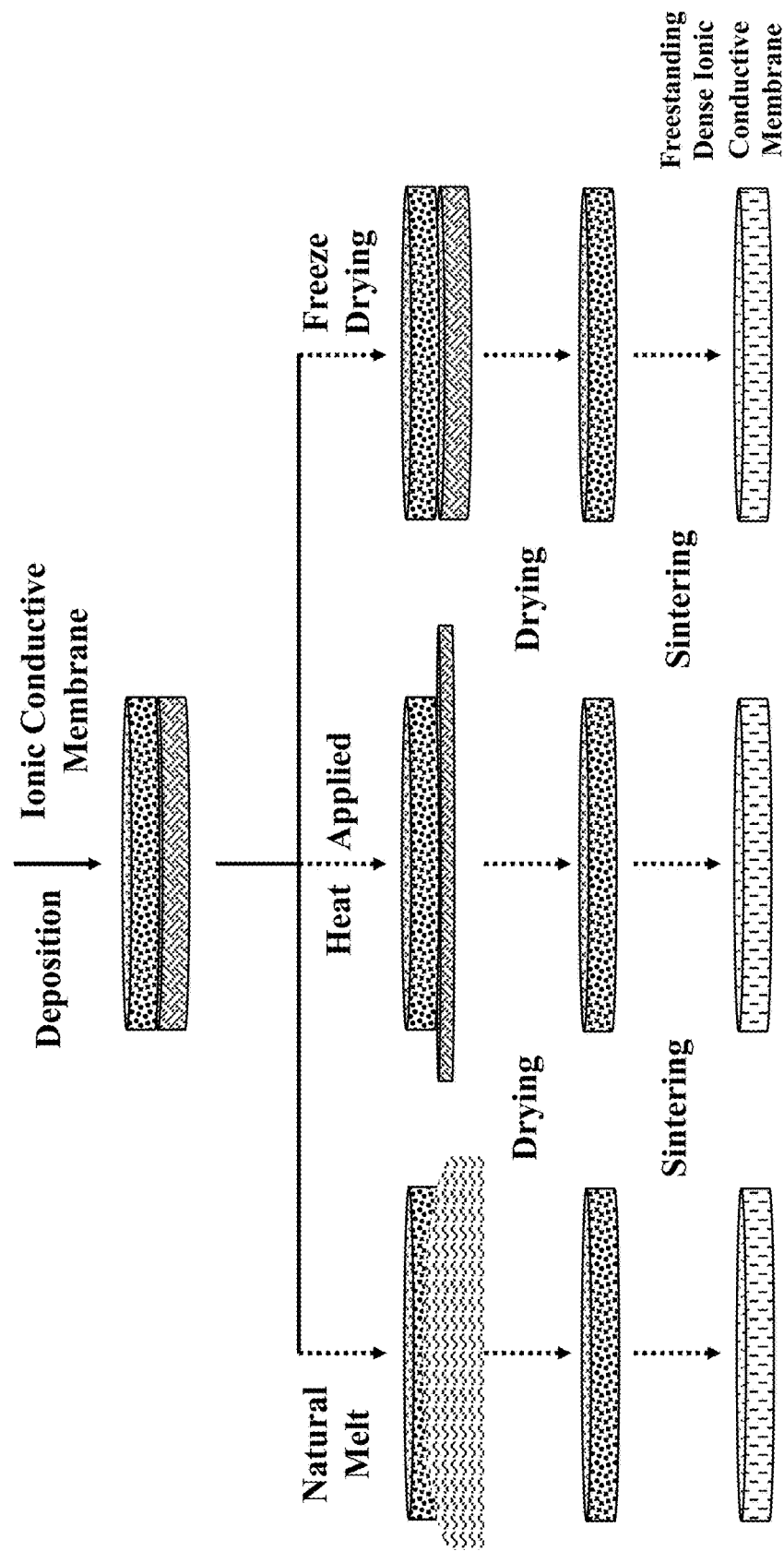
FIG. 5 is a schematic illustrating the deposition of a solid state ionic conductive membrane on an ice substrate followed by the removal of the ice substrate through natural melting, heating and freeze drying.

FIG. 5: A schematic illustrating the deposition of a solid state ionic conductive membrane on an ice substrate followed by the removal of the ice substrate through natural melting, heating and freeze drying.

Figure 6:
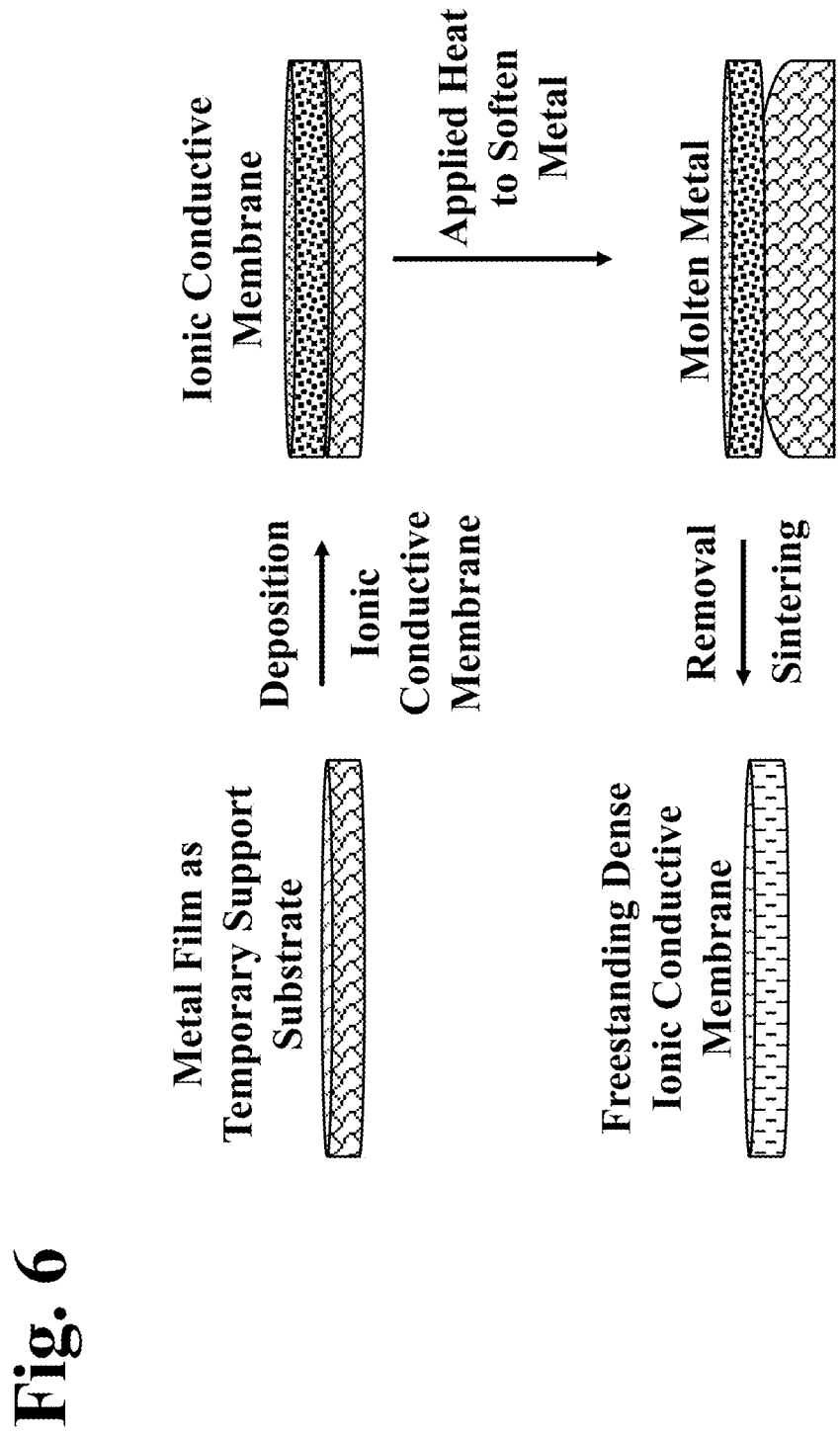
FIG. 6 is a schematic illustrating the deposition of a solid state ionic conductive membrane on a metal film followed by the softening of the metal film and sintering of the solid state ionic conductive membrane.

FIG. 6: A schematic illustrating the deposition of a solid state ionic conductive membrane on a metal film followed by the softening of the metal film and sintering of the solid state ionic conductive membrane.

Figure 7A:
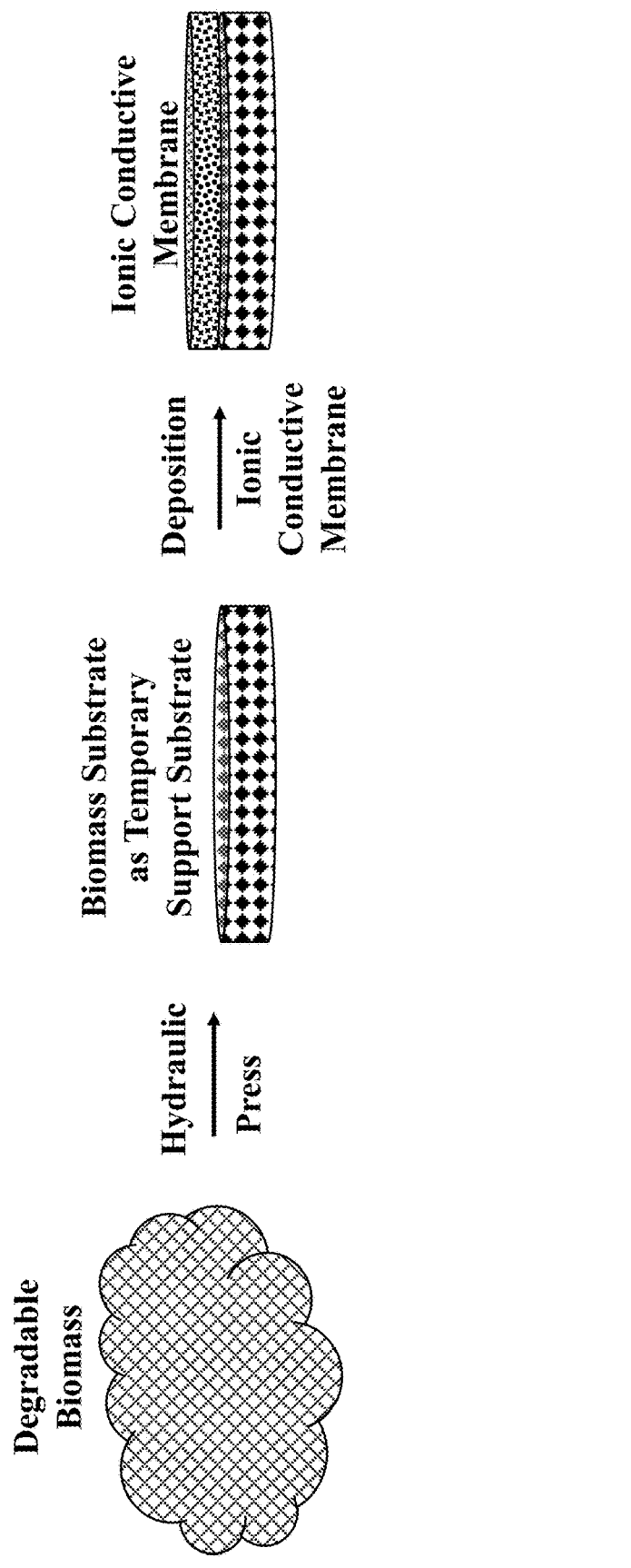
FIG. 7a is a schematic illustrating the pressing of a degradable biomass followed by the deposition of a solid state ionic conductive membrane.

FIG. 7a: A schematic illustrating the pressing of a degradable biomass followed by the deposition of a solid state ionic conductive membrane.

Figure 7B:
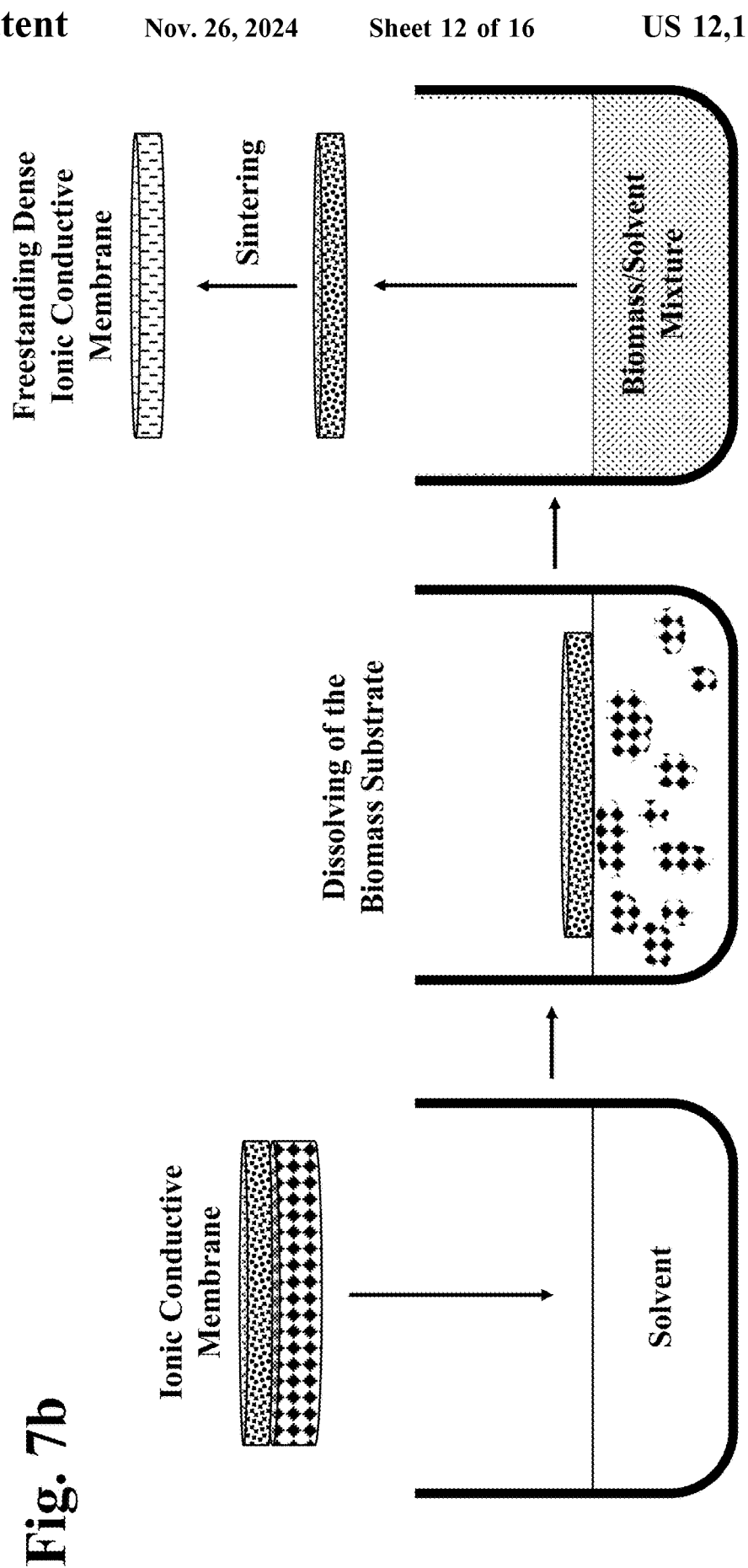
FIG. 7b is a schematic illustrating the removal of the biomass substrate in a solvent followed by the sintering of the solid state ionic conductive membrane.

FIG. 7b: A schematic illustrating the removal of the biomass substrate in a solvent followed by the sintering of the solid state ionic conductive membrane.

Figure 7C:
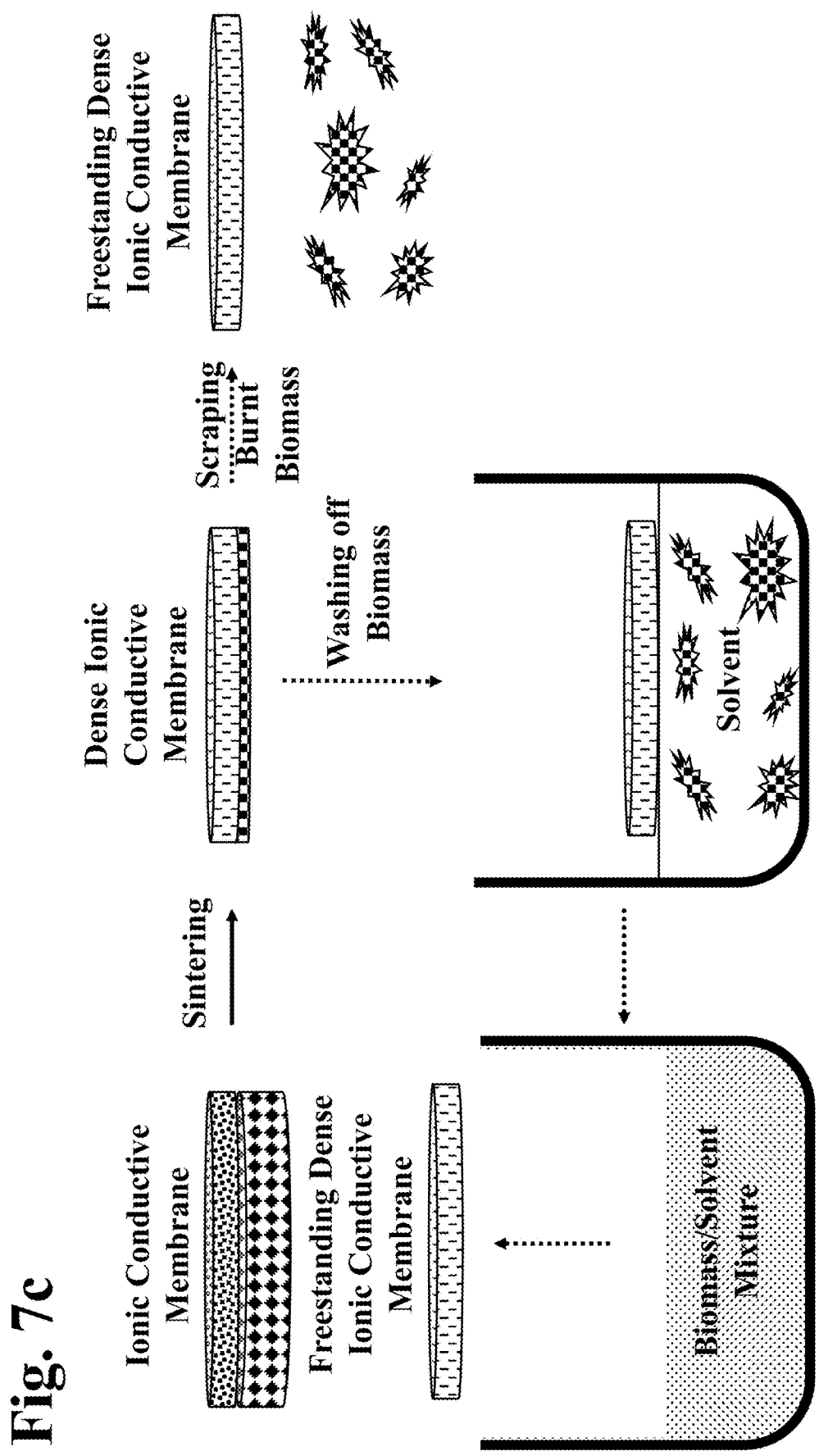
FIG. 7c is a schematic illustrating the sintering of A solid state ionic conductive membrane followed by possible removal processes of excess burnt biomass.

FIG. 7c: A schematic illustrating the sintering of A solid state ionic conductive membrane followed by possible removal processes of excess burnt biomass.

Figure 8A:
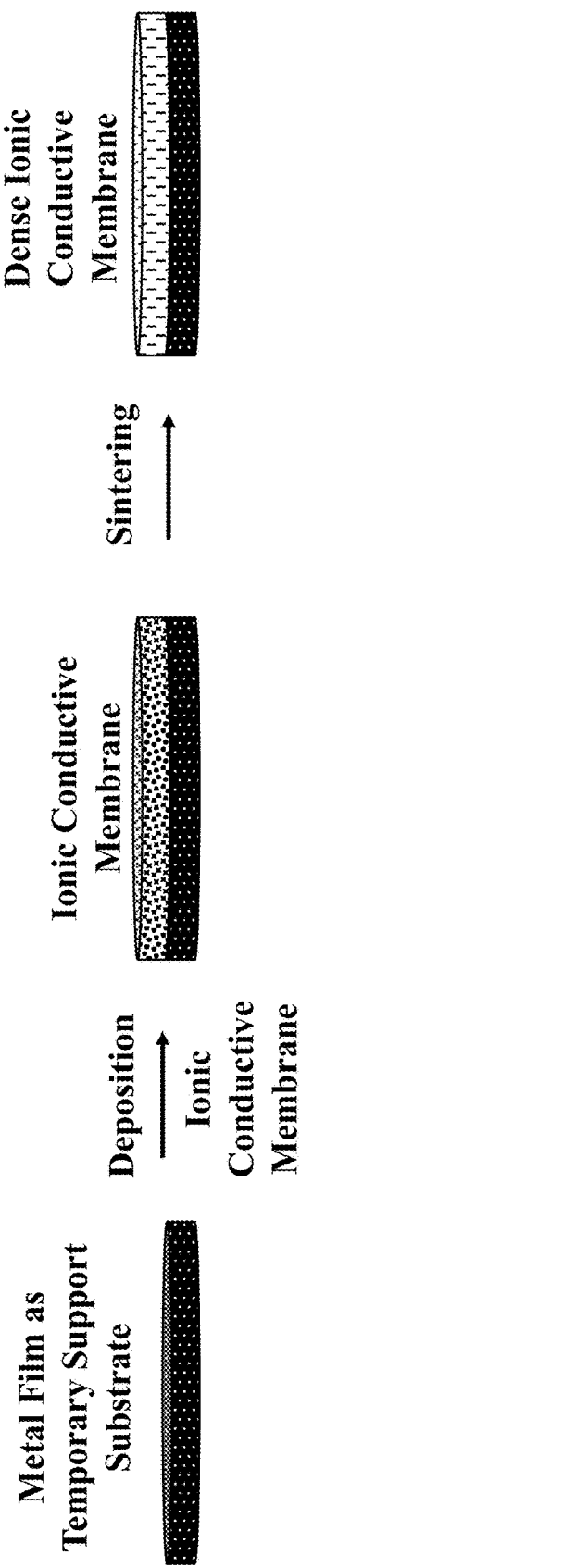
FIG. 8a is a schematic illustrating the deposition of a solid state ionic conductive membrane on a metal film followed by sintering of the solid state ionic conductive membrane.

FIG. 8a: A schematic illustrating the deposition of a solid state ionic conductive membrane on a metal film followed by sintering of the solid state ionic conductive membrane.

Figure 8B:
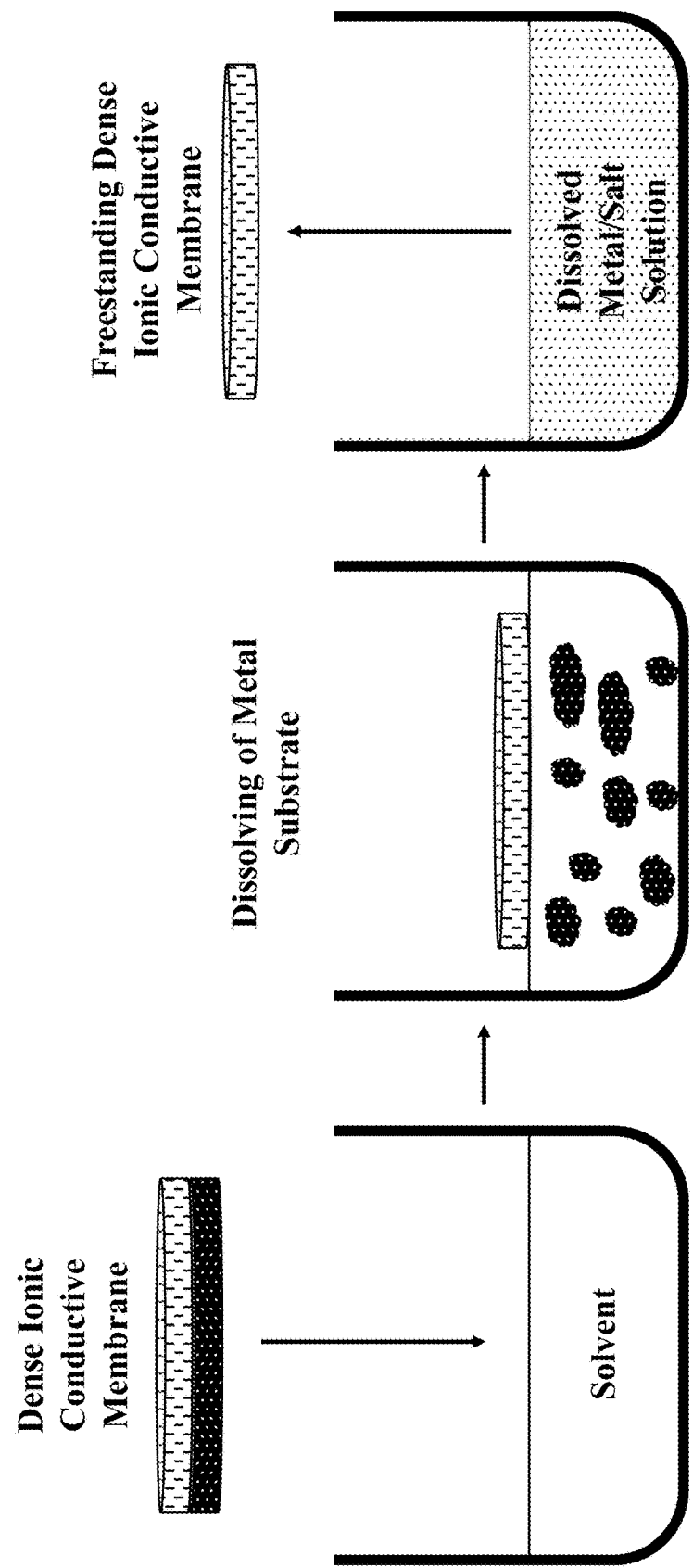
FIG. 8b is a schematic illustrating the dissolving of the metal film in a solvent.

FIG. 8b: A schematic illustrating the dissolving of the metal film in a solvent.

Figure 9:
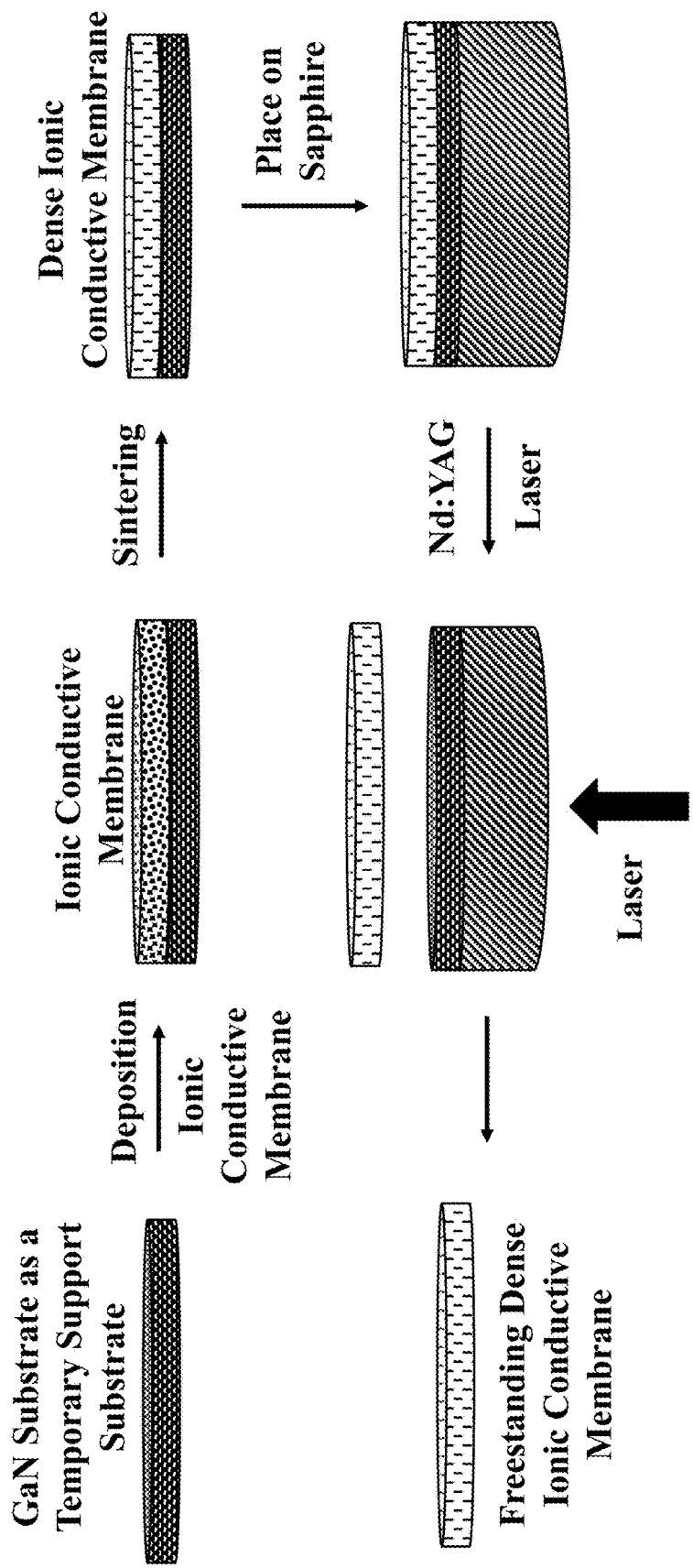
FIG. 9 is a schematic illustrating the deposition of a solid state ionic conductive membrane onto a gallium nitride substrate followed by sintering of the solid state ionic conductive membrane and the removal of a solid state ionic conductive membrane by placing it on a sapphire substrate and applying a Nd: YAG laser.

FIG. 9: A schematic illustrating the deposition of a solid state ionic conductive membrane onto a gallium nitride substrate followed by sintering of the solid state ionic conductive membrane and the removal of a solid state ionic conductive membrane by placing it on a sapphire substrate and applying a Nd: YAG laser.

With reference to the above figures, methods for forming a freestanding ionic conductive membrane may include one of the following.

In an aspect, a solid state ionic conductive membrane can be built onto the surface of a water dissolvable crystal salt substrate acting as a removable support substrate. The salt can be crystalline or non-crystalline. The solid state ionic conductive membrane can then be thermally treated or sintered. The single crystal salt substrate then can be dissolved away in water leaving a freestanding ionic conductive membrane.

Examples of water dissolvable salt substrates may include, but not limited to halide, sulfate, nitrate, hydroxide, oxide, sulfide, carbonate, nitrite, acetate, citrate, cyanide, phosphate, etc.

In an aspect, a salt film may be deposited onto the surface of a removable support substrate. A solid state ionic conductive membrane may then be built on top of the salt film. The ceramic membrane can then be thermally treated or sintered. The salt film can be removed by place the solid state ionic conductive membrane in water to dissolve the salt film leaving a freestanding ionic conductive membrane. The salt removing process and the sintering process can be reversed if the film can hold its shape after formation.

Examples of salt films may include, but not limited to halide, sulfate, nitrate, hydroxide, oxide, sulfide, carbonate, nitrite, acetate, citrate, cyanide, phosphate, etc.

Examples of a removable support substrate may include, but not limited to glass, silicon wafer, copper foil, titanium foil, polymer sheet, carbon tape, composite sheet, etc.

In an aspect, combustible supporting material can act as a removable support substrate. A solid state ionic conductive membrane can be constructed onto the surface of the removable support substrate. The removable support substrate can either be burnt slowly or rapidly depending on the type of material used as the removable support substrate leaving the solid state ionic conductive membrane freestanding. The resulting freestanding ionic conductive membrane can be thermally treated or sintered.

Examples of combustible material include flammable paper may include, but not limited to, bank paper, bond paper, book paper, flash paper, was paper, etc., another example, carbon tape or carbon paste coated materials.

In an aspect, a resin can be placed onto the surface of a removable support substrate. After curing of the resin, A solid state ionic conductive membrane can be built on top of the resin layer. The solid state ionic conductive membrane can then be thermally treated or sintered. The resins can then be chemically removed by placing the solid state ionic conductive membrane in an appropriate aqueous or non-aqueous solvent leaving the solid state ionic conductive membrane freestanding. Alternatively, the resins can be chemically removed prior to thermal treatment leaving the ceramic ionic conductive freestanding. The resulting freestanding ionic conductive membrane can then be thermally treated or sintered.

Examples of removable support substrates may include, but not limited to glass or a silicon wafer.

Examples of resins may include, but not limited to polyesters, epoxies, polyurethanes and silicones.

In an aspect, the resins may be deposited onto the removable support substrate by means of, but not limited to, spin coating, drop casting, dipping, etc.

In an aspect, a cryo method can incorporate an icy flat surface to act as removable support substrate. A solid state ionic conductive membrane can be built onto the surface of an ice substrate. The ice is then removed by either applying heat, allowing for natural melt, or adjusting the pressure for sublimation through a freeze dry process. The freestanding ionic conductive membrane can then be thermally treated or sintered.

An example of a type of ice may include, but not limited to dry ice or frozen water.

In an aspect, a metal film with a low melting point can act as a removable support substrate. A solid state ionic conductive membrane can be built onto the surface of the metal film. The metal can then be softened or dewetted at an elevated temperature to remove the solid state ionic conductive membrane. The resulting freestanding ionic conductive membrane can be further thermally treated or sintered.

An example of a metal with a low melting point may include, but not limited to tin, tellurium, gallium or indium. It is preferred that the metal used have a low to mild toxicity level. Moreover, it is preferred that the metal have a melting point lower than any sintering temperature of the solid state ionic conductive membrane.

In an aspect, a biodegradable target can be assembled using a hydraulic press which can act as a removable support substrate. The solid state ionic conductive membrane can be built onto the biodegradable substrate. The substrate can then be removed by pacing the solid state ionic conductive membrane in an aqueous or non-aqueous solution to dissolve the biodegradable substrate leaving a freestanding ionic conductive membrane. The resulting freestanding ionic conductive membrane can then be further thermally treated or sintered. Alternatively, the solid state ionic conductive membrane can be thermally treated or sintered while on the biodegradable substrate. The sintering temperature can allow for a rapid decomposition of the biodegradable substrate. Excess biodegradable substrate can be removed by scraping off the material, bio-digested using bacteria, or dipping into a solvent solution to be dissolved away.

Examples of biodegradable materials may include, but not limited to biomass pellets, sawdust, sugar, etc.

In an aspect, a metal film may be used as the removable support substrate. The solid state ionic conductive membrane can be built onto the film surface. The solid state ionic conductive membrane can then be thermally treated or sintered. The metal film can then be dissolved by placing the solid state ionic conductive membrane in a diluted aqueous or non-aqueous solution.

An example includes building the solid state ionic conductive membrane on a copper film. After thermal treatment the solid state ionic conductive membrane can be placed in a diluted solution of hydrogen peroxide and hydrochloric acid.

In an aspect, Laser lift off (LLO) techniques can be used to remove the substrates, a gallium nitride, sapphire, glass or a polymer may be used as a removable support substrate. The solid state ionic conductive membrane can be built onto the surface of the support substrate. A buffer layer can be added or not. The solid state ionic conductive membrane can be thermally treated or sintered before or after the lift off process. A Nd: YAG laser, or KrF laser can pass through the substrate causing the solid state ionic conductive laser to delaminate, releasing the solid state ionic conductive membrane resulting in a freestanding ionic conductive membrane.

In an aspect, the solid state ionic conductive membrane can be formed with traditional slurry sedimentation, spraying, dipping, filtration, pyrolysis, electroplating, plasma spray, thermal spray, fume spray, screen printing, tape casting, injection, chemical vapor deposition, physical vapor deposition and sputtering. These processes can be followed by heat treatment to densify the solid state ionic conductive layer.

Although various embodiments of the disclosed method for manufacturing a freestanding solid state ionic conductive membrane have been shown and described, modifications may occur to those skilled in the art upon reading the specification. The present application includes such modifications and is limited only by the scope of the claims.

What is claimed is:

1. A method for manufacturing a freestanding solid state ionic conductive membrane, the method comprising:
   providing a removable support substrate, wherein the removable support substrate comprises a carbon tape or a carbon paste coated material;
   forming a solid state ionic conductive membrane directly on the carbon tape or carbon paste coated material, wherein the entirety of the solid state ionic conductive membrane is directly on the carbon tape or carbon paste coated material, wherein the solid state ionic conductive membrane comprises a solid state ionic conductive material that selectively allows at least one of $Li^+$, $Na^+$, and $K^+$ to pass through under the presence of an electric field or chemical potential, wherein a solid state ionic conductivity of the solid state ionic conductive material is higher than $>10^{-7}$ S/cm; and
   combusting the at least one of carbon tape and carbon paste coated material to remove the removable support substrate from the solid state ionic conductive membrane, whereby the entirety of the solid state ionic conductive membrane becomes completely detached to provide the freestanding solid state ionic conductive membrane.

2. The method of claim 1, wherein the step of forming the solid state ionic conductive membrane directly on the carbon tape or carbon paste coated material comprises at least one of slurry sedimentation, spraying, dipping, pyrolysis, electroplating, plasma spray, thermal spray, fume spray, screen printing, tape casting, injection, chemical vapor deposition, physical vapor deposition, and sputtering.

3. The method of claim 1, wherein the freestanding solid state ionic conductive membrane comprises a garnet-like structure oxide material, a perovskite-type oxide material, a NASICON-structure material, an anti-perovskite structure material, and a $Li_3YH_6$ (H=F, Cl, Br, I) family of materials, wherein Y can be replaced by other rare earth elements.

4. The method of claim 1, further comprising densifying the solid state ionic conductive membrane, wherein the densified solid state ionic conductive membrane has a density of 80% or higher of the theoretical density of the solid state ionic conductive material.

5. The method of claim 1, wherein the step of densifying the solid state ionic conductive membrane occurs during or after the step of removing the removable support substrate.

6. The method of claim 1, wherein the step of densifying the solid state ionic conductive membrane comprises heat treating the solid state ionic conductive membrane.

7. The method of claim 1, wherein the step of heat treating the solid state ionic conductive membrane comprises sintering the solid state ionic conductive membrane.

8. The method of claim 1, wherein the freestanding solid state ionic conductive membrane comprises a garnet-like structure oxide material.

9. The method of claim 1, wherein the step of densifying the solid state ionic conductive membrane occurs during the step of removing the removable support substrate.

10. The method of claim 1, wherein the step of densifying the solid state ionic conductive membrane occurs after the step of removing the removable support substrate.

11. The method of claim 1, wherein the removable support substrate comprises a carbon tape.

12. The method of claim 1, wherein a thickness of the freestanding solid state ionic conductive membrane is 0<thickness<400 μm.

13. The method of claim 1, wherein a thickness of the freestanding solid state ionic conductive membrane is thicker than 50 nm and thinner than 400 micrometer.

14. The method of claim 1, wherein the freestanding solid state ionic conductive membrane is planar.

* * * * *